United States Patent [19]
Roth

[11] Patent Number: 5,617,491
[45] Date of Patent: Apr. 1, 1997

[54] ESTIMATION OF SURFACE GEOMETRY FROM RELATIVE RANGE IMAGES

[75] Inventor: Gerhard Roth, Gloucester, Canada

[73] Assignee: National Research Council of Canada, Ottawa, Canada

[21] Appl. No.: 442,356

[22] Filed: May 16, 1995

Related U.S. Application Data

[63] Continuation of Ser. No. 149,842, Nov. 9, 1993, abandoned.

[51] Int. Cl.$^6$ ....................................... G06K 9/36
[52] U.S. Cl. .......................... 382/285; 382/108; 382/203; 395/120; 395/141
[58] Field of Search ..................................... 382/100, 108, 382/173, 203, 206, 285, 286; 364/578; 395/120, 121, 125, 141, 142

[56] References Cited

U.S. PATENT DOCUMENTS 5,119,309  6/1992  Cavendish et al. .................. 395/120
5,142,659  8/1992  Rao et al. ............................ 382/9
5,189,626  2/1993  Colburn .............................. 395/120

Primary Examiner—Leo Boudreau
Assistant Examiner—Phuoc Tran
Attorney, Agent, or Firm—Neil Teitelbaum & Associates

[57] ABSTRACT

A semi-automatic method is provided for finding an equation for a geometric surface patch that closely approximates a geometric surface within a digitized scene. By finding equations for patches within a scene, equations representing the entire scene can be found by stepwise sequential processing or alternatively by a system capable of parallel processing. Initially an operator using a mouse or pointing device selects a region from the digitized scene, and then selects one of a plurality of geometric surface types to represent a predominant geometric surface covered by the region. The process is based on randomly choosing the minimal number of data points from the selected region. Based on this information an equation of a surface on which the randomly selected points lie is determined. The process is repeated a predetermined number of times and the equation of the surface with the maximum number of associated data points is selected.

5 Claims, 3 Drawing Sheets

ESTIMATION OF SURFACE GEOMETRY FROM RELATIVE RANGE IMAGES

This application is a Continuation of application Ser. No. 08/149,842, filed on Nov. 9, 1993, now abandoned.

FIELD OF THE INVENTION

The invention relates to computer vision, and more particularly to a method for estimating the surface geometry of a range image.

BACKGROUND OF THE INVENTION

In recent years there has been considerable activity in understanding sensed relative range images. These images comprise data obtained directly by active sensors such as laser rangefinders, or by processing passive sensor data by methods such as stereo vision. As of late, estimating geometric primitives represented by digital range data has been of interest in the robotics industry, the automotive industry, as well as many others especially pertaining to reverse engineering applications.

A geometric primitive is a curve or surface such as a plane, which has a defining equation. For example, a bounded plane is a geometric primitive, and, as well, a single point, or pixel, represented in a Cartesian space is also a geometric primitive. Determining geometric primitives representing or approximating objects within a scanned image often depends on first determining object boundaries so that objects may be isolated from one another.

U.S. Pat. No. 5,142,659, issued Aug. 25, 1992 in the name of Rao et at. entitled Estimation of Local Surface Geometry From Relative Range Images for Object Recognition, describes an apparatus and method for improved segmentation and object recognition. Rao et al. describe objects and background from sensed relative images based on calculations of desired local surface geometry such as local surface orientation, local surface curvature, surface extent and occluding boundaries. The patent specifically focuses on a system which is somewhat tolerant to "rollover", a problem in long distance sensing.

Another patent relating to image processing and image detection is U.S. Pat. No. 5,202,928 in the name of Tomita et al. issued Apr. 13, 1993 entitled Surface Generation Method From Boundaries of Stereo Images. The patent relates specifically to the matching of edges detected in images of the same objects in a three-dimensional scene that are taken simultaneously by two or more image pick-up devices at different positions.

Although both of these patents appear to perform their intended functions, there is a need for an efficient, robust, semi-automatic method for extracting geometric primitives from range data.

It is common for image processing systems relating to three dimensional images, to invoke methods that map pixels, in the form of range image data points to planar surfaces, or to second order or higher order surfaces, thereby approximating range image data points by surfaces. These systems are generally, either automatic or manual and the processes they use are generally classed as fitting processes. In ordinary fitting, an assumption is made that all the points belong to the curve or surface being fit. Automatic systems do not require an operator to intervene or to assist in the processing of image data. Manually driven systems require a skilled user to very accurately select a region in which function approximation is required. For example, an experienced user would typically encircle a region with a mouse, taking great care not to include outlier points not determined to be within the region of interest. For processes that are based on extraction, or robust fitting, this assumption does not hold. Extraction is a generalization of fitting, and is sometimes given the name robust fitting. Thus, an extraction routine must yield not only the equation of the best primitive (curve or surface), but, also specifies which of the data points are described by this primitive. Determining geometric primitives representing or approximating objects within a scanned image by extraction, does not depend on first determining object boundaries to ensure that objects be isolated from one another. The extraction routine in accordance with this invention is tolerant of outlier points that do not belong on a surface patch being approximated, therefore a user of the system described hereafter, is not constrained by required precision of selecting a region accurately as is the case in manual methods. The method in accordance with this invention is semi-automatic.

It is an object of this invention to provide an extraction method which is based on random sampling for surfaces defined both implicitly and parametrically.

It is on object of the invention to provide a semi-automatic method of extracting a geometrical surface from range image data.

It is a further object of the invention to provide a method for determining an equation defining an optimal surface to describe a set of points within a certain tolerance.

SUMMARY OF THE INVENTION

In accordance with this invention a method is provided of finding an equation for a geometric surface patch that closely approximates a selected region of a digitized scene, the scene comprising a plurality of surface patches represented by a plurality of data points, the method comprising the steps of:

a) selecting a region from the digitized scene;

b) selecting one of a plurality of geometric surface types to represent the geometric surface covered by the region;

c) determining a minimal number of data points required to define the selected surface type;

d) randomly selecting the minimal number of data points from the selected region;

e) computing from the surface type and the selected minimal number of data points, an equation of the surface through the randomly selected points;

f) counting the number of data points in the selected region that are within a predetermined distance from the geometric surface defined by the equation; and, g) repeating steps (d) to (f) a predetermined number of times, and selecting the equation of the surface with the maximum number of counted data points.

A minimal subset is the smallest set of points that are necessary to define a geometric primitive uniquely. For example a plane is defined by three points, a sphere is defined by 4 points and an ellipse by 5 points and so on.

The extraction process in accordance with this invention based on random sampling can be applied to the extraction of surfaces that are defined implicitly. Some examples of such surfaces are planes, spheres and quadrics.

Besides being defined implicitly, geometric primitives can also be defined by a set of parametric equations. A parametric representation is used in the description of objects contained in a computer-aided design (CAD) system. Since such CAD systems are very common, being able to extract geometric primitives defined parametrically is of practical importance. This invention will be described in light of a more general class of parametric surfaces whose parametric equations are a linear combination of basis functions, along with the rational versions of such equations.

For the purposes of illustration, examples will be shown for the extraction of parametric curves, but the same approach can be used for extracting parametric surfaces.

BRIEF DESCRIPTION OF THE DRAWINGS

Exemplary embodiments of the invention will be described in conjunction with the drawings, in which:

FIG. 4b is diagram illustrating a best curve found by extraction using the data points of FIG. 4a;

DETAILED DESCRIPTION

Representing Geometric Primitives Implicitly

Figure 1A:
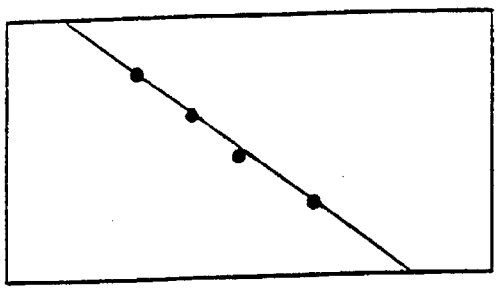
FIG. 1a is a diagram illustrating robust extraction of inlier points.

A curve or surface in implicit form is defined as the set of points that are the zeros of one or more functions. A 2D curve in implicit form is a set of points S defined in the following fashion:

$$S=\{(x,y):f(x,y)=0\}$$

Similarly, a 3D surface is defined as:

$$S=\{(x,y,z):f(x,y,z)=0\}$$

A 3D curve is defined as the intersection of two 3D surfaces as follows:

$$S=\{(x,y,z):f(x,y,z)=0, g(x,y,z)=0\}$$

The notation used for a single implicit function is $f(\bar{p}; \bar{a})$, where the datum point is $\bar{p}$, and $\bar{a}$ defines a parameter vector for this particular primitive. This parameter vector is not the same as the parameters used to generate a curve or surface in parametric form. For the implicit form, different curves or surfaces are defined by changing the value of the parameter vector $\bar{a}$. As an example of this notation, a plane is defined implicitly by the equation $a_0+a_1x+a_2y+a_3z=0$ where the parameter vector $\bar{a}$ is $(a_0, a_1, a_2, a_3)$ and the datum point $\bar{p}$ is $(x,y)$. The implicit form naturally divides space into three regions: f>0, the points on one side of the curve or surface; f<0, the points on the other side of the curve or surface, and f=0, the points on the curve or surface.

Representing Geometric Primitives Parametrically

The parametric form is a very common way of defining geometric primitives curves and surfaces. In this form each coordinate is written explicitly as a function of a number of parameters. A 2D curve is defined in parametric form as a set of points S in the following fashion:

$$S=\{(x,y):x=f(t), y=g(t), t\in R\}$$

Similarly a 3D curve is defined as:

$$S=\{(x,y,z): x=f(t), y=g(t), z=h(t), t\in R\}$$

A 3D surface is defined as:

$$S=\{(x,y,z):x=f(u,v),y=g(u,v),z=h(u,v),(u,v)\in R^2\}$$

With this notation, the domain of the parameters t, u, and v, is R, the set of real numbers. A curve is parameterized by a single variable t, while a surface requires two variables u and v. The parametric form is preferable for generating and manipulating the shape of a curve or surface. The points on the curve or surface can be generated by varying the parameter(s) through a range of real values. The curve or surface can be manipulated by rewriting the parametric form in terms of control points. Then the shape of the geometric primitive can be easily and naturally modified by moving these control points. Since generation and manipulation are the most common activities in CAD systems, the parametric form is very useful.

Parametric equations can be written as a linear combination of a set of basis functions, which themselves may be nonlinear. These basis functions can be rational, which means they are divided by a set of weights.

Assuming that there are R basis functions labeled $b_1$ to $b_R$ for a curve these basis functions have as their argument a single parameter t, for a surface their arguments are two parameters u, and v. So for a curve $b_i(t)$ is basis function $b_i$ evaluated at the parameter value t and for surface $b_i(u,v)$ is basis function $b_i$ evaluated at the parameter values u, and v. Any type of basis function can be used so this notation is general enough to describe a variety of different parametric surfaces such as a Bézier surface, or Coons patches.

The equation of a planar curve defined parametrically as a linear combination of basis functions is as follows:

$$x=f_0b_1(t)+f_1b_2(t)+\ldots+f_Rb_R(t)$$

$$y=g_0b_1(t)+g_1b_2(t)+\ldots+g_Rb_R(t)$$

In this notation the vectors $(f_0, \ldots, f_R)$, and $(g_0, \ldots g_R)$, are the scalar coefficients of these R basis functions. This notation is generalized by assigning weights to each of these basis functions. These weights are defined by another vector $(w_0, \ldots w_R)$, and they divide the original equation of the curve as follows.

$$x=\frac{f_0b_1(t)+f_1b_2(t)+\ldots+f_Rb_R(t)}{w_0b_1(t)+w_1b_2(t)+\ldots+w_Rb_R(t)}$$

-continued
$$y = \frac{g_0 b_1(t) + g_1 b_2(t) + \ldots + g_R b_R(t)}{w_0 b_1(t) + w_1 b_2(t) + \ldots + w_R b_R(t)}$$

The same notation is trivially generalized to a three dimensional curve, or a surface. The only difference for a surface is that the basis functions have as input the values of two parameters u, v. For curves and surfaces defined parametrically the coefficients of the basis functions taken together define a parameter vector $\bar{a}$. Different instances of the geometric primitive can be obtained by changing the value of $\bar{a}$.

This rational parametric form is very general, and is in fact a more general version of what are referred to as NURBS in the literature. These are non-rational, B-splines parameterized in a non-uniform fashion. No restrictions are placed on the parameterization of the curve or surface. It may be selected in any way that is appropriate; the basis functions need not be any particular basis, such as the B-spline basis. Defining curves and surfaces as a linear combination of basis function, or the rational versions of such functions is very general. This notation can describe all the parametric surfaces currently in use in CAD systems. It should be noted that parametric equations are often shown in vector form. The non-vector form is preferred for notational clarity.

Fitting Versus Extraction

In both extraction and fitting processes the input data consists of N geometric data points in Cartesian space and a definition of a particular type of geometric primitive. The output of a fitting process is the equation of the primitive which is the best fit to the input data points. In fitting, the assumption is made that all the input points truly belong to the geometric primitive. If this is not the case then the resulting fit can be arbitrarily bad. Points that belong to the primitive are called inliers, while points that do not belong are called outliers. A robust fitting process has the ability to tolerate outliers.

The extraction process of this invention is a robust fitting process; it is identical to fitting, with one important difference; in primitive extraction the assumption is not made that all of the input points belong to the primitive. Along with an equation of the best primitive, an extraction method determines which subset of the geometric data points belong to the primitive (the inliers) and ignores the rest (the outliers). The output of the primitive extraction process is the equation of the best primitive, along with a division of the input points into inliers and outliers. If all the input points are inliers then an extraction process should produce the same results as a standard non-robust fitting process. Thus extraction can be seen as a robust form of fitting.

Figure 1B:
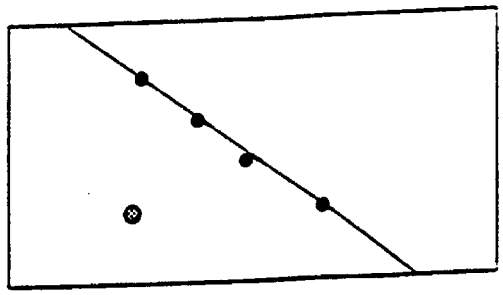
FIG. 1b is a diagram illustrating robust extraction with a single outlier point.

This is shown clearly in FIG. 1 which shows the extraction algorithm applied to a set of points that define a line, along with a single outlier point not on the line. In part (a) of FIG. 1 where there are no outliers the results are the same as a fitting algorithm. However, in part (b) the single outlier has been ignored, and the correct line has been found. The term "robust fitting" has already been defined by in the field of robust statistics. However, the concept of extraction is not equivalent to robust fitting. This is because here the outliers are not considered as simply noise points, but as points that potentially define a number of other valid geometric primitives. Therefore the percentage of outliers may be much less than 50% of the geometric data points. The extraction process is capable of handling such a case, which is considered to be beyond the scope of robust fitting algorithms.

Extracting Parametric Surfaces

The basis of the extraction process is that there be a threshold that defines a fixed-band around any geometric primitive. In operation, a user of the system, specifies a tolerance and a result is produced that is within the specified tolerance. Of course, since the number of points within the fixed band are returned as well as an equation defining the primitive, and since the number of total points within a selected region are known, the quality or accuracy of the resulting equation defining the geometric primitive can be determined. Points outside the fixed-band are outliers, and points inside this band are inliers.

Converting from a minimal subset of geometric data points to the equation of a particular type of geometric primitive will now be described. To perform this conversion it is necessary that each of the N geometric data points have an associated parameter value(s). These parameter assignments order the points on the curve or surface in the sense that they define a neighbour relationship. There are a number of different methods that can be used to make these parameter assignments, such as a uniform parameterization, or a chord-length parameterization. The manner in which a parameter value is assigned to each geometric data point is not of importance; all that is necessary is that each of the R geometric data points be associated with a given parameter value(s).

By way of example, the conversion of a minimal subset to the equation of a parametric curve which is defined as a linear combination of basis vectors will be described. For this example the basis functions will be $1$, $t$ and $t^2$ and the curve is defined by the equations $x = f_0 + f_1 t + f_2 t^2$, $y = g_0 + g_1 t + g_2 t^2$. Here the parameter is t, and the basis functions are polynomials. The size of a minimal subset is three, and the minimal subset points are $(x_0, y_0), (x_1, y_1)$ and $(x_2, y_2)$. The associated t parameter values for these three points are $t_0, t_1$, and $t_2$. The following two linear systems of equations are the result of substituting each of these points into the parametric equation of the curve.

$$x_0 = f_0 + f_1 t_0 + f_2 t_0^2$$

$$x_1 = f_0 + f_1 t_1 + f_2 t_1^2$$

$$x_2 = f_0 + f_1 t_2 + f_2 t_2^2$$

$$y_0 = g_0 + g_1 t_0 + g_2 t_0^2$$

$$y_1 = g_0 + g_1 t_1 + g_2 t_1^2$$

$$y_2 = g_2 + g_1 t_2 + g_2 t_2^2$$

Given these points and their associated parameter values the unknowns in each of these equations are $f_0, f_1, f_2$ and $g_0, g_1, g_2$. These six unknowns together define the parameter vector $\bar{a}$ of this curve. These two systems are linear in these unknowns, and can be solved efficiently using known numerical methods.

This approach can be used to convert from the minimal subset points to the parametric equation whenever this equation is defined by a linear combination of basis functions. Now considering a rational version of the same curve. In this case $$x = \frac{f_0 + f_1 t + f_2 t^2}{w_0 + w_1 t + w_2 t^2}$$

and $$y = \frac{g_0 + g_1 t + g_2 t^2}{w_0 + w_1 t + w_2 t^2}.$$

So there are now three extra parameters $w_0$, $w_1$ and $w_2$. However, $w_0$ can be normalized to one without changing these equations, which means only $w_1$ and $w_2$ are free. This makes $$x = \frac{f_0 + f_1 t + f_2 t^2}{1 + w_1 t + w_2 t^2}$$

and $$y = \frac{g_0 + g_1 t + g_2 t^2}{1 + w_1 t + w_2 t^2}.$$

The number of unknowns has increased from six, to eight. Thus the size of the minimal subset is four points since each minimal subset point contributes two equations. Substituting these four points into the parametric equations produce the following linear system with eight unknowns.

$$x_0 = f_0 + f_1 t_0 + f_2 t_0^2 - w_1 x_0 t_0 - w_2 x_0 t_0^2$$

$$x_1 = f_0 + f_1 t_1 + f_2 t_1^2 - w_1 x_1 t_1 - w_2 x_1 t_1^2$$

$$x_2 = f_0 + f_1 t_2 + f_2 t_2^2 - w_1 x_2 t_2 - w_2 x_2 t_2^2$$

$$x_3 = f_0 + f_1 t_3 + f_2 t_3^2 - w_1 x_3 t_3 - w_2 x_3 t_3^2$$

$$y_0 = g_0 + g_1 t_0 + g_2 t_0^2 - w_1 y_0 t_0 - w_2 y_0 t_0^2$$

$$y_1 = g_0 + g_1 t_1 + g_2 t_1^2 - w_1 y_1 t_1 - w_2 y_1 t_1^2$$

$$y_2 = g_0 + g_1 t_2 + g_2 t_2^2 - w_1 y_2 t_2 - w_2 y_2 t_2^2$$

$$y_3 = g_0 + g_1 t_3 + g_2 t_3^2 - w_1 y_3 t_3 - w_2 y_3 t_3^2$$

This linear system can also be solved by numerical methods, but is larger than the systems produced for the non-rational counterpart of the same curve. For a non-rational curve defined by R basis functions, converting from R minimal subset points to the parameter vector requires the solution of two sets of linear equations of size R. If the curve was defined rationally then this same process requires the solution of a single linear system of larger size. The same methodology can be applied to parametric surfaces. If there are R basis functions in the linear form, then this conversion requires the solution of three linear systems of size R. Similarly, if the linear form is rational, then this conversion requires the solution of a larger single linear system. It is important to note that this method will work for any set of basis functions, even though the previous example uses the power basis (polynomials). Bézier basis, or the B-spline basis could just as well be used.

Finally, computation of the closest distance of a point to the geometric primitive defined parametrically must be performed. Consider geometric data point i, which for a two-dimensional curve is $x_i$, $y_i$. Each geometric data point has an associated parameter value, which is $t_i$. This parameter value is the one that this geometric data point would have if it were on the curve. However, even if this point is not on the curve as a first approximation the closest curve point to $x_i, y_i$ is $x(t_i), y(t_i)$. Since the initial assignment of the parameter values to each geometric data point can only be done in a heuristic fashion this can only be an approximation. However, it is the case that for the closest point the parameter values t must make the distance $(x(t)-x_i)^2 + (y(t)-y_i)^2$ a minimum.

While the initial value of t is not likely to be the true value of the optimum t, it is often a good initial approximation. Given this initial approximation the Newton-Rhapson algorithm can be used to adjust the parameter value to produce a better estimate of the closest point. This converges in very few iterations, and is equally applicable to curves and surfaces. The initial assignment of parameter values to each geometric data point need only be approximate for the Newton-Rhaphson algorithm to converge. Thus the closest point computation tends to relatively insensitive to the choice of initial parameterization. However, the actual shape of the curve or surface is affected by the choice of parameterization, but not as much as might be expected.

Experimental Results

In this section we will show some experimental results of the extraction process. The process will be applied to the problem of extracting parametrically defined two dimensional curves. The particular curves that we extract are defined by the power basis with four elements. This makes the parametric equations $x = f_0 + f_1 t + f_2 t^2 + f_3 t^3$, and $y = g_0 + g_1 t + g_2 t^2 + g_3 t^3$. In all the examples a fixed-band constraint was used in which points having residual errors are greater than a certain threshold were ignored. However, as was discussed in the previous section, the same approach can be used for other types of geometric primitives.

Figure 2A:
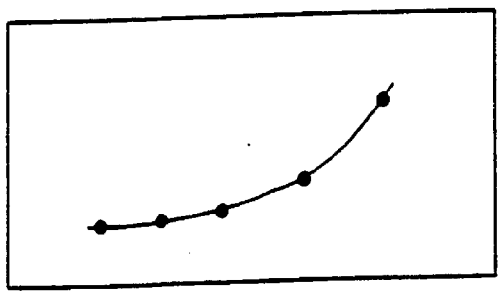
FIG. 2a is a diagram illustrating robust extraction of inlier points.
Figure 2B:
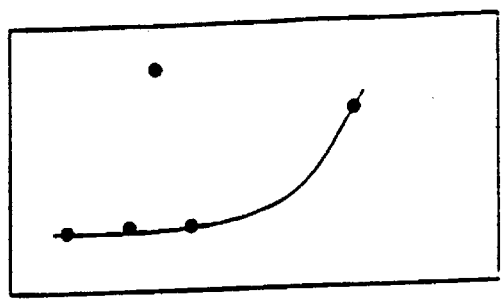
FIG. 2b is a diagram illustrating robust extraction with a single outlier point.

FIG. 2 shows the difference between extraction and fitting of a parametric curve. In part (a), we see a number of points, all of which are on a curve, along with the curve that is fit to these points. In part (b) we see the same points, but with a single outlier, a point not on this curve. The resulting extracted curve, as shown in part (b) ignores this outlier, and still finds the original curve.

Figure 3A:
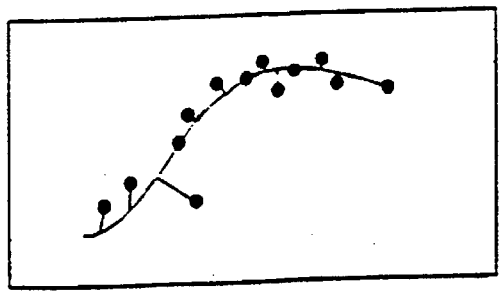
FIG. 3a is a diagram illustrating a first method of finding residuals.
Figure 3B:
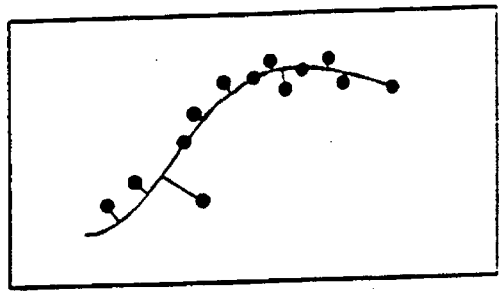
FIG. 3b is a diagram illustrating an alternative method to that of FIG. 3a of finding residuals.
Figure 4A:
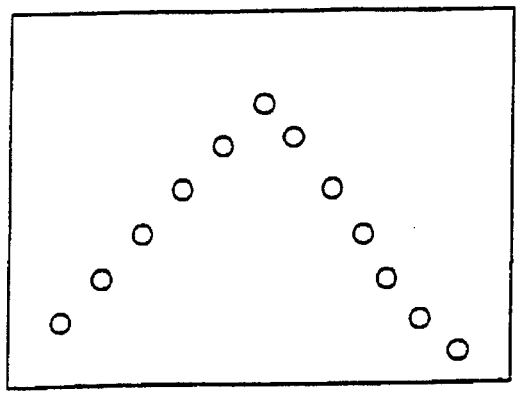
FIG. 4a is a diagram illustrating data points forming two geometric primitives.
Figure 4B:
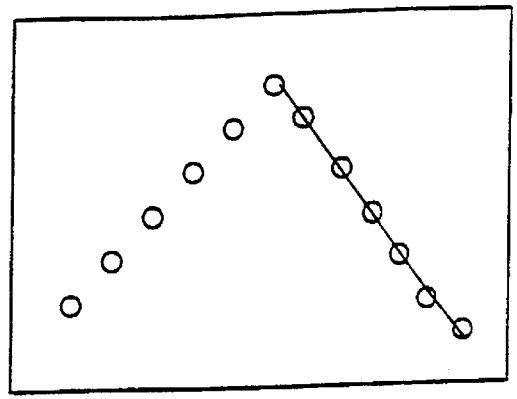
Figure 4C:
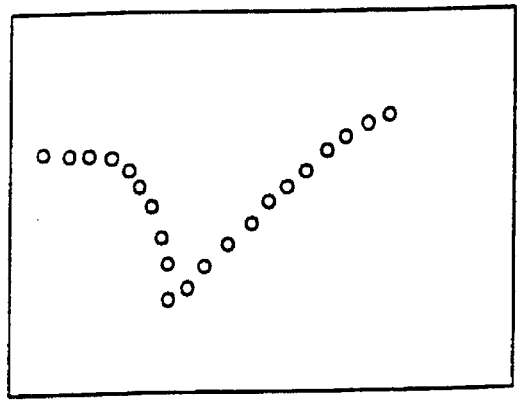
FIG. 4c is a diagram illustrating data points forming two geometric primitives.
Figure 4D:
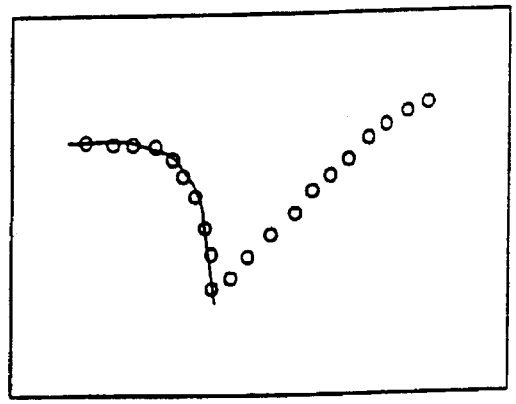
FIG. 4d is a diagram illustrating a best curve found by extraction using the data points of FIG. 4c; and, FIG. 5 is a block diagram showing a configuration of an image processing apparatus used for carrying out the method in accordance with the present invention.

Referring to FIG. 3, the effects of different methods of calculating the residuals is shown. These residuals are the distance of a geometric data point to the closest point on the curve. This information is essential for evaluating the quality of a potential geometric primitive defined by a minimal subset. As was pointed out earlier, initially every geometric data point is assigned a parameter value(s) by whatever method is appropriate. As a first estimate this parameter value defines a point on the geometric primitive which is closest to the geometric data point. However, this is only an approximation to the closest point as is clear from FIG. 3. Here the closest point on the curve calculated by the two different methods is connected to each geometric data point by a straight line. In part (a) of FIG. 3 the curve extracted when the closest point is assumed to be at the initial parameter value of the curve is shown. In part (b) of this figure we see the results of extraction when the closest point is adjusted using the iterative Newton-Rhapson algorithm described in the previous section. The closest point is obtained more accurately in part (b), and thus the evaluation of a potential curve is more reliable. This improves the results of primitive extraction by making the extracted primitive more independent of the initial parameterization.

The final example shows the algorithm applied to situations where the outliers are not noise, but instead, make up another geometric primitive. In FIG. 4 parts (a) and (c) are the original points, while parts (b) and (d) show the extracted curve. By simply applying the extraction process on the remaining outliers, the second geometric primitive could be extracted. The extraction process can thus be used to find a number of geometric primitives by such an iterative approach. Thus extraction is a much more general concept than robust fitting, since the outliers are not assumed to be noise points, but may define a number of geometric primitives.

Figure 5:
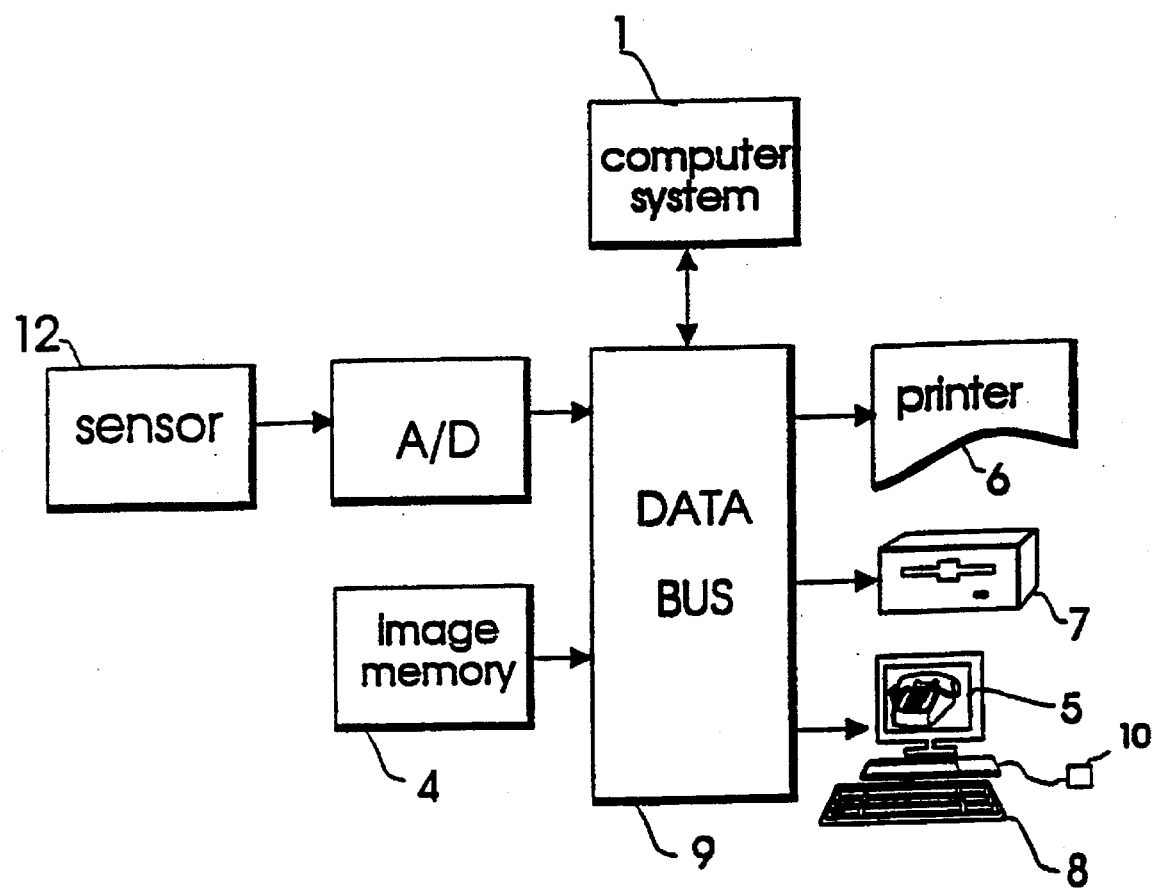

FIG. 5 is a block diagram showing a configuration of an image processing apparatus used for carrying out the method in accordance with the present invention.

The apparatus includes a computer system 1 as a CPU, a television camera unit as an image pickup device in the form of a range finding sensor 12, an image memory 4, a CRT display 5, a printer 6, a floppy disc system 7, a keyboard terminal 8, and a data bus 9 connecting the above components, and the like. A pointing device in the form of a mouse 10 is shown attached to the terminal 8.

In operation, an observed scene is sensed by the range finding sensor 12. The sensor 12 outputs a relative range image 14 of the observed scene which is then inputted to the computing system 1. The computing system can be a computer, microcomputer, or other device of choice.

It is incumbent upon a user of the system to understand some basic precepts of the system in order to maximize upon its capabilities. For example, if the user was attempting to model a digitized scene such as a telephone set shown on the CRT display 5 in FIG. 5, the steps that should be performed (from the user's standpoint) are as follows:

a) using the mouse, selecting a continuous geometric region that appears to have depth and orientation discontinuities;

If the user is attempting to model the telephone set shown, it is preferred that the telephone set be segmented into regions according to geometric criteria. For example, The hand set would be isolated from the keypad portion, and the keypad portion being a distinct and separate intersecting plane from the side of the phone set would be isolated from it when using the mouse. Since the user is aware that the system will be finding equations for separate primitives, the initial selection is made on what intuitively appears to be a separate and distinct primitive, thus assisting the system in more quickly and precisely determining equations.

b) from a library of geometric primitives, choose a primitive that most closely approximates the selected region; and, c) choose a tolerance band to limit the precision of the equation returned.

Once the user has performed these steps the computing system 1 then performs the following steps:

i) determining a minimal number of data points required to define the selected surface type;

ii) randomly choosing the minimal number of data points from the selected region;

iii) computing from the surface type and the selected minimal number of data points, an equation of a surface on which the randomly selected points lie;

iv) counting the number of data points in the selected region that are within a predetermined distance from the geometric surface defined by the equation;

g) repeating steps (ii) to (iv) a predetermined number of times, and selecting the equation of the surface with the maximum number of counted data points;

After this, the best equation within the given tolerance band is be returned by the system.

This method of this invention is a hybrid of the automatic and the manual methods described heretofore; this hybrid method provides advantages of both systems and suffers from few of the drawbacks and limitations of either. Having the user make an initial assessment regarding segmentation by selecting areas that appear to define primitives has great and obvious advantageous. However, as opposed to the manual method, the hybrid approach does not require precision or exactness of the user in selecting the regions since the system is tolerant of outlier points that are included in the selection don't belong to a particular geometric primitive.

Numerous other embodiments may be envisaged without departing from the spirit and scope of the invention.

What I claim is:

1. A method of finding a geometric surface patch represented by an equation, the surface patch closely approximating a geometric surface within a digitized scene, the scene comprising a plurality of surface patches represented by a plurality of data points, the method comprising the steps of:

a) digitizing the scene by sensing relative range information about a plurality of points observed in a scene using a rangefinding sensor;

b) inputting the sensed relative range information into a computer having a random access memory;

c) storing the digitized scene in the random access memory, the digitized scene comprising a plurality of data points;

d) using the computer to select a region from the digitized scene consisting of a set of points in three dimensions stored in the random access memory;

e) selecting one of a plurality of geometric surface types from a library of geometric surface types to represent a predominant geometric surface covered by the region;

f) determining a minimal number of data points required to define the selected surface type;

g) selecting the minimal number of data points by randomly choosing the data points from the selected region;

h) using the computer to compute from the surface type and the selected randomly chosen minimal number of data points, an equation of a surface patch on which the randomly selected points lie;

i) counting the number of data points in the selected region that are within a predetermined distance from the geometric surface patch defined by the equation; and, j) repeating steps (g) to (i) a predetermined number of times, and selecting the surface patch with the maximum number of counted data points.

2. A method as defined in claim 1, wherein the selected region is larger than and at least completely covers the surface patch it approximates.

3. A method as defined in claim 2, wherein the predetermined distance is a tolerance in the form of a fixed band around the geometric surface being approximated.

4. A method of finding a plurality of geometric surface patches closely approximating a geometric surface within a digitized scene, the scene comprising a plurality of surface patches represented by a plurality of data points stored within a random access memory, each surface patch represented by an equation, the method comprising the steps of:

a) digitizing the scene using a rangefinding sensor by sensing relative range information about a plurality of points observed in a scene;

b) storing the digitized scene in the random access memory, the digitized scene comprising a plurality of data points;

c) using a computer pointing device to select a region from the digitized scene consisting of a set of points in three dimensions stored in the random access memory;

d) having an operator choose one of a plurality of geometric surface types from a library of geometric surface types to represent a predominant geometric surface covered by the region;

e) determining a minimal number of data points required to define the selected surface type;

f) selecting the minimal number of data points by randomly choosing the data points from the selected region;

g) computing from the surface type and the selected randomly chosen minimal number of data points, an equation of a surface patch on which the randomly selected points lie;

h) counting the number of data points in the selected region that are within a predetermined distance from the geometric surface patch defined by the equation;

i) repeating steps (f) to (h) a predetermined number of times, and selecting the surface patch with the maximum number of counted data points; and, j) repeating steps (c) to (i) a plurality of times to acquire a plurality of selected surface patches.

5. A method as defined in claim 4, further comprising the step of providing the selected surface patches in the form of their defining equations to a modeling system for building a model of the geometric surface.

* * * * *